United States Patent Office 3,235,711
Patented Feb. 15, 1966

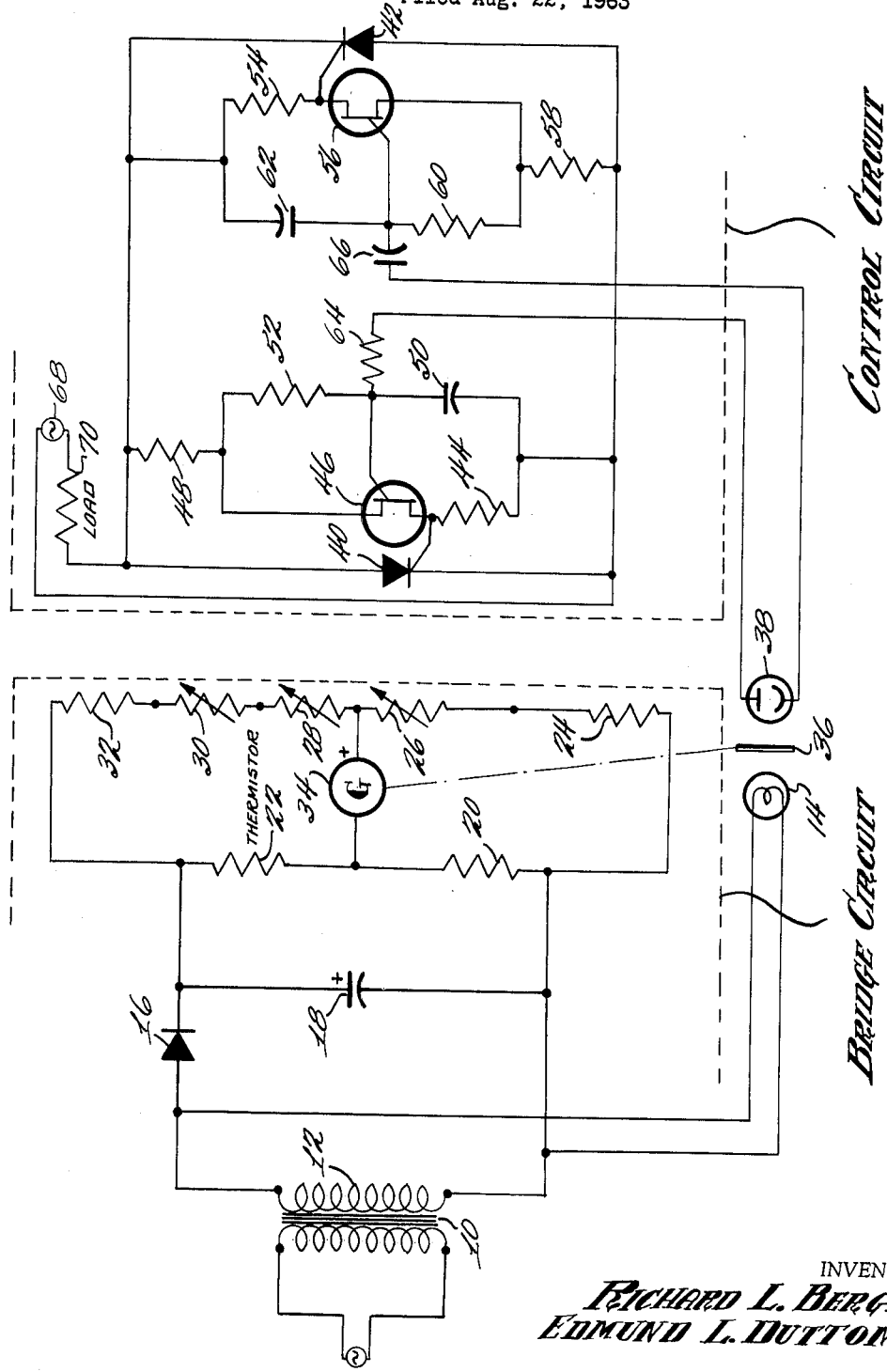

3,235,711
CONTROL CIRCUIT
Richard Louis Bergen and Edmund L. Dutton, Marietta, Ohio, assignors to Forma Scientific, Inc., Marietta, Ohio, a corporation of Ohio
Filed Aug. 22, 1963, Ser. No. 303,813
5 Claims. (Cl. 219—499)

This invention relates to a control circuit and more particularly to a circuit employing silicon controlled rectifiers combined with a sensing arrangement to proportionally control the operation of electrical devices such as an electric heater.

A number of heater control circuits have been utilized in the past in monitoring the operation of electric heaters. However, these circuits have generally suffered the disadvantages of slow response to temperature changes or the burden of extensive and costly apparatus in sophisticated rapidly responsive arrangements.

The control circuit which constitutes the invention overcomes these disadvantages by providing an extremely sensitive control arrangement utilizing a simplified and compact arrangement of components.

Another object of the invention is to provide an arrangement for controlling the operation of an electric heater wherein the system is responsive to low level control signals.

A further object is to provide a control arrangement for an electric heater which responds to minor variations in ambient temperature to monitor the system.

Further objects and the entire scope of the invention will become more fully apparent when considered in light of the following detailed description of an illustrative embodiment of this invention and from the appended claims.

The illustrative embodiment may best be understood by reference to the accompanying drawing which illustrates a schematic diagram of the control system as employed in monitoring an electric heater.

Briefly, the invention comprises a proportional controller utilizing a galvanometer Wheatstone bridge sensing circuit for detecting a variation in temperature of the area being heated from a selected temperature. When the bridge is unbalanced due to a temperature variation from that desired, the galvanometer operates to vary passage of light to a photocell to proportionally change its resistance. The photocell is connected in a resistive-capacitive network in the emitter circuits of a pair of unijunction transistors. These transistors respectively trigger each of a pair of back-to-back silicon controlled rectifiers which vary the current flow through the heater resistance.

Referring more specifically to the drawing, the structure of the illustrative embodiment will be discussed. The over-all circuit may broadly be divided into two portions, one being the bridge circuit and the other the control circuit per se. Considering first the bridge portion, an alternating supply is connected to the primary winding of a step-down transformer 10 to produce a reduced alternating voltage across the secondary winding 12 thereof. Connected in parallel with the winding 12 is a pilot light 14 which serves to indicate that the arrangement is operating. The pilot light is also employed as a light source to cooperate with a photocell in a manner to be hereinafter described in detail. Connected to one end of the secondary winding 12 is the anode of a diode 16. The cathode of this diode is connected through a condenser 18 to the other end of secondary winding 12. In parallel with condenser 18 is a Wheatstone bridge arrangement. This comprises a resistor 20 in series with a temperature sensitive resistance 22, shown as a thermistor, this series combination being in parallel with condenser 18. Connected in parallel with resistors 20 and 22 is another series arrangement of resistors comprising a fixed resistor 24, a first potentiometer 26, a second potentiometer 28, a third potentiometer 30 and an additional fixed resistor 32. To complete the bridge, meter 34 is joined between the junction of resistors 20 and 22 and the junction of resistors 26 and 28. The deflection needle of the meter 34 is mechanically connected to a flag 36 which is generally positioned in the path between the pilot light 14 and a photoelectric cell 38 which constitutes a portion of the control circuit per se which will now be structurally described.

The controller comprises a pair of silicon controlled rectifiers 40 and 42 which are connected back-to-back such that the cathode of one is directly connected to the anode of the other and vice versa. In parallel with SCR 40, there is provided a first unijunction transistor arrangement in which the cathode of SCR 40 is connected through a resistor 44 to the base-one of a unijunction transistor 46. This base-one is also connected to the gate of SCR 40. Base-two of the unijunction transistor 46 is connected through a resistance 48 to the anode of SCR 40. Connected between the cathode of SCR 40 and the emitter of UJT 46 is a condenser 50 and between the emitter of UJT 46 and its base-two is connected a resistor 52. In parallel with SCR 42 there is a second unijunction transistor circuit identical to that just described. Connected to the cathode of SCR 42 through a resistor 54 is the base-one of unijunction transistor 56. The base-two of this UJT is connected through a resistance 58 to the anode of SCR 42. The base-one of UJT 56 is also connected to the gate of SCR 42. Between the emitter and base-two of UJT 56 there is connected a resistor 60, and between the cathode of SCR 42 and the emitter of UJT 56 is positioned a condenser 62. As a proportionally responsive input circuit interconnecting the emitters of UJT's 46 and 56 is a series arrangement comprising a resistor 64, the photoelectric cell 38 and a condenser 66. To complete this portion of the over-all circuit, there is positioned across the SCR 40 a source of heater current 68 and the load resistor 70 which constitutes the heater.

Now that the structure of the control circuit has been set forth, its operation will be described. Basically, the bridge circuit is standard, the diode 16 and condenser 18 serving to rectify and smooth the alternating voltage appearing at the secondary winding 12 in order to provide a D.C. supply to the bridge arms. The bridge itself utilizes resistors 26 and 30 to calibrate the reference dial of the meter. Potentiometer 28 is utilized to select a desired operating temperature. The variable resistance characteristic of the thermistor 22 is employed to sense ambient temperature changes. By electrically placing the galvanometer in the bridge circuit to measure unbalance between the bridge arm containing potentiometer 28 and the arm containing thermistor 22, a current is generated to deflect the galvanometer in proportion to the difference between the desired set temperature established by potentiometer 28 and the actual temperature affecting thermistor 22. The deflections of the meter are utilized to vary the passage of light between source 14 and the photoelectric cell 38 by moving the flag 36.

The description will now be expanded to explain the operation of the controller portion of the over-all circuit. Under properly operating conditions, during which there is no deflection of the galvanometer due to a temperature differential between the set and actual temperatures, the resistance of the photocell is such that the unijunction transistors and the silicon controlled rectifiers are in a cut off condition. Under such condition, the load 70 is connected in series with the biasing arrangement for the UJT's and the SCR's, and constant current passes through the load 70 to properly maintain the set temperature.

When the ambient temperature rises above the desired temperature selected by potentiometer 28, the flag is moved by deflection of the galvanometer to vary the light passing to photocell 38 in proportion to the temperature differential. This results in a proportional increase of the resistance of photocell 38 to thereby decrease the current passing through load 70 thereby reducing the heat generated by the electrical heater. Accordingly, the ambient temperature is reduced to the selected level.

However, when the ambient temperature falls below that selected, the meter is deflected in a manner such that the light falling on the photocell causes the resistance of the cell 38 to decrease proportionally. During one half of the alternating cycle of voltage supply 68, the decreased resistance of cell 38 allows the emitter of unijunction transistor 46 to be raised more positive than the base-one voltage thereof to a degree sufficient to drive the emitter voltage beyond the threshold point thereby commencing conduction between the emitter and base-one of UJT 46. Due to the negative resistance characteristic of the unijunction transistor, the UJT 46 continues to conduct even though the emitter voltage may be falling. This insures that a low level signal is developed across resistor 44 of sufficient time duration to trigger this SCR 40 into conduction thereby short circuiting the biasing arrangement for the UJT's and the SCR's resulting in increased load current through resistor 70. During the next half cycle of the voltage supply 68, the anode voltage of SCR 40 is diminished to a point at which the conduction of this SCR is terminated. However, the emitter of the UJT 56 is being driven positive with respect to its base-one and on reaching the threshold point begins to conduct to provide a low level input signal across resistor 54 thereby causing SCR 42 to begin conduction. In the same manner as described with reference to SCR 40, the conduction of SCR 42 allows the load current to increase. Accordingly, by the back-to-back arrangement of the SCR's, a full wave A.C. control is achieved. This allows the heater to increase the ambient temperature to proportionally decrease the deflection of the galvanometer which, in turn, controls the operation of the UJT's and SCR's. The proportionally responsive resistive-capacitive network, including the photocell 38, determines the ratio of interbase voltages to emitter voltages for controlling the firing of the UJT's. Consequently, the conduction angle of the SCR's is determined by the time constant of the resistive-capacitive network, which is dependent on the variable resistance of the photocell, to proportionally control the temperature developed by the heater.

Although the invention described herein has been illustrated as being utilized to control an electric heater, it will be understood that the control circuit may be employed with other electrical devices to proportionally control current therethrough in response to measurable variations of a condition from that selected.

The above described embodiment is illustrative of a preferred embodiment of the invention but is not intended to limit the possibilities of insuring a sensitive, rapidly responsive control circuit for controlling the operation of electrical equipment. The control circuit disclosed herein is an example of an arrangement in which the inventive features of this disclosure may be utilized, and it will become apparent to one skilled in the art that certain modifications may be made within the spirit of the invention as defined by the appended claims.

What is claimed is:

1. A control circuit for proportionally controlling the operation of an electric heater comprising: sensing means for detecting ambient temperature variations from a selected temperature and means proportionally responsive to the temperature variation detected by said sensing means for varying the current through said heater; said proportionally responsive means including first and second unijunction transistors, an input circuit interconnecting said unijunction transistors and proportionally responsive to the temperature variations detected by said sensing means, and a pair of silicon controlled rectifiers respectively connected to the outputs of said unijunction transistors, said rectifiers being interconnected to be alternately conductive; said proportionally responsive means being electrically connected to said heater and operative to vary the current through said heater in response to the variations detected by said sensing means.

2. A control circuit as set forth in claim 1 wherein said input circuit comprises a resistive-capacitive network, the resistance being proportional to the variation of the ambient temperature from the selected temperature.

3. A control circuit as set forth in claim 2 wherein a decrease in ambient temperature from a selected temperature proportionally decreases the resistance of said input circuit thereby permitting one of said unijunction transistors and its associated silicon controlled rectifier to conduct and subsequently the other of said unijunction transistors and its associated rectifier to conduct, the conduction of said rectifiers short circuiting said proportionally responsive means thereby increasing the current through the heater.

4. A control circuit as set forth in claim 2 wherein an increase in ambient temperature proportionally increases the resistance of said input circuit to decrease the current through said heater.

5. A control circuit for proportionally controlling the operation of an electric device comprising: sensing means for detecting variations of a condition from a selected condition and means proportionally responsive to the variation detected by said sensing means for varying the current through said device; said proportionally responsive means including first and second unijunction transistors, an input circuit interconnecting said unijunction transistors and proportionally responsive to the variations detected by said sensing means, and a pair of silicon controlled rectifiers respectively connected to the outputs of said unijunction transistors, said rectifiers being interconnected to be alternately conductive; said proportionally responsive means being electrically connected to said device and operative to vary the current through said device in response to the variations detected by said sensing means.

References Cited by the Examiner

UNITED STATES PATENTS

| 2,947,875 | 8/1960 | Beck | 219—501 |
| 2,954,479 | 9/1960 | Cibelius | 219—501 |
| 3,051,813 | 8/1962 | Busch et al. | 219—489 |
| 3,097,314 | 7/1963 | Harriman | 219—501 |
| 3,109,910 | 11/1963 | Fogleman | 219—505 |
| 3,146,392 | 8/1964 | Sylvan | 307—88.5 |

RICHARD M. WOOD, *Primary Examiner.*

ANTHONY BARTIS, *Examiner.*